United States Patent [19]
Masaki

[11] Patent Number: 5,540,975
[45] Date of Patent: Jul. 30, 1996

[54] MAGNETIC RECORDING MEDIUM COMPRISING A MAGNETIC LAYER OF FERROMAGNETIC METAL POWDER AND BINDER RESIN AND HAVING SPECIFIED MAGNETIC PROPERTIES

[75] Inventor: Kouichi Masaki, Kanagawa, Japan

[73] Assignee: Fuji Photo Film Co., Ltd., Kanagawa, Japan

[21] Appl. No.: 454,723

[22] Filed: May 31, 1995

[30] Foreign Application Priority Data

May 31, 1994 [JP] Japan .................................. 6-139683

[51] Int. Cl.$^6$ ...................................... G11B 5/00
[52] U.S. Cl. ......................... 428/141; 428/328; 428/336; 428/694 BA; 428/694 BS; 428/900
[58] Field of Search ..................... 428/141, 328, 428/336, 694 BA, 694 BS, 900

[56] References Cited

U.S. PATENT DOCUMENTS 5,384,175  1/1995  Kojima et al. ............... 428/64
5,443,879  8/1995  Kodama et al. .............. 428/65.7

FOREIGN PATENT DOCUMENTS

05242462  9/1993  Japan .
05274651  10/1993  Japan .
05290359  11/1993  Japan .

*Primary Examiner*—Stevan A. Resan
*Attorney, Agent, or Firm*—Sughrue, Mion, Zinn, Macpeak & Seas

[57] ABSTRACT

A magnetic recording medium comprising a nonmagnetic support having thereon a magnetic layer comprising a ferromagnetic metal powder and a binder resin, or having in this order thereon a nonmagnetic layer comprising a nonmagnetic material powder and a binder, and a magnetic layer comprising a ferromagnetic metal powder and a binder resin, wherein the magnetic layer exhibits a coercive force of from 2,000 to 3,000 Oe, and has a thickness of from 0.05 to 0.3 μm, a surface roughness of from 1 to 3 nm, and the proportion of magnetizable components that are inverted by an external magnetic field of not less than 3,000 Oe in the magnetic layer is from 1% to (0.0225×(coercive force of magnetic layer)−38)% as determined by the remanence curve of the magnetic layer.

12 Claims, 1 Drawing Sheet

FIG. 1

MAGNETIC RECORDING MEDIUM COMPRISING A MAGNETIC LAYER OF FERROMAGNETIC METAL POWDER AND BINDER RESIN AND HAVING SPECIFIED MAGNETIC PROPERTIES

FIELD OF THE INVENTION

The present invention relates to a magnetic recording medium such as magnetic tape. More particularly, the present invention relates to a magnetic recording medium comprising a magnetic layer comprising a particulate ferromagnetic metal provided on a nonmagnetic support, which can perform recording at a density as high as not more than 0.6 μm in terms of recording wavelength (½ Tb (time bit) in digital recording) and exhibits an excellent data erasability and overwritability.

BACKGROUND OF THE INVENTION

Magnetic recording technique has been widely utilized in various fields such as video equipment, audio equipment and computers because of its excellent advantages which cannot be seen in other recording systems. That is, it enables repeated use of media, it can easily use a signal in an electronic form, enabling the configuration of a system combined with peripheral, and it can modify a signal.

In order to cope with the tendency toward miniaturization of equipment, the demand for improvement in the quality of recorded and reproduced signals, the demand for prolongation of recordable time and the demand for increase in the recording capacity, it has been desired to further improve the recording density, reliability and durability of recording media.

In audio and video applications, for example, in order to cope with the development of a digital recording system realizing improved sound quality and picture quality into practical use and the development of a video recording system adapted for high definition TV, magnetic recording media enabling the recording and reproduction of short wave signals and having an excellent reliability and durability against the increase in the speed of the head relative to the medium have been required more than required in the conventional systems.

In order to allow such a coating type magnetic recording medium to perform high density recording, various methods have been studied and proposed to use an iron powder or a magnetic alloy powder mainly comprising iron instead of magnetic iron oxide powder which has heretofore been used, improve the magnetic properties of the magnetic layer by improving the fineness, packing and orientability of magnetic powder, enhance the dispersibility of ferromagnetic powder, or improve the surface properties of the magnetic layer.

For example, a method which comprises using a ferromagnetic metal powder or hexagonal ferrite powder as a ferromagnetic powder to improve the magnetic properties thereof is disclosed in JP-A-58-122623 (The term "JP-A" as used herein means an "unexamined published Japanese patent application"), JP-A-61-74137, JP-B-62-49656 (The term "JP-B" as used herein means an "examined Japanese patent publication"), JP-B-60-50323, U.S. Pat. Nos. 4,629,653, 4,666,770, and 4,543,198.

In order to enhance the dispersibility of a ferromagnetic powder, the use of various surface active agents is proposed in JP-A-52-156606, JP-A-53-15803, and JP-A-53-116114.

Further, the use of various reactive coupling agents is proposed in JP-A-49-59608, JP-A-56-58135, and JP-B-62-28489.

Further, in order to improve the surface properties of a magnetic layer, the improvement in the method for forming and treating the surface of a magnetic layer after the coating and drying of the magnetic layer is proposed in JP-B-60-44725.

In order to secure output in a short recording wavelength range, efforts have been made to enhance the coercive force of the magnetic recording medium or increase the packing of the magnetic recording medium to provide a higher magnetic flux density. In another approach, the thickness of the magnetic layer is reduced to reduce the self-demagnetization thereof and hence secure output in a short recording wavelength range.

For example, JP-A-63-187418 discloses a wet-on-wet process magnetic recording medium composed of an lower nonmagnetic layer and an upper magnetic layer, the upper magnetic layer being made of iron oxide and having a thickness of 0.5 μm at least.

In recent years, digital recording of video signal has been studied. In VTR system for consumer use such as DVC (digital video for consumer use), the miniaturization of hard ware involving the cost reduction and easy operation is essential. To this end, the use of a band compression technique has been proposed for hard ware part. For the part of magnetic recording medium, the reduction of the width and thickness of video tape and the width of recording track has been proposed.

As a result, the tape width has been reduced to ¼ in., which is half that of the current VHS video tape. The tape thickness has been reduced-to 7 μm. The recording track width has been reduced to 10 μm (corresponding to that of the long time recording mode of 8 mm VTR tape). In the proposed magnetic recording medium, the recording current and other specifications are determined on the basis of metal evaporation tape. The proposed magnetic recording medium is further characterized by the ability to simultaneously recording a signal having a wavelength as short as 0.5 μm and a servo signal having a wavelength of 45 times that of the former and the track width which is narrower than that of the magnetic head.

In the foregoing recording system, signals are partially overwritten by means of a magnetic head having a width greater than that of recording track to record in a narrow track a signal containing a component having a wavelength of about 50 times the shortest recording wavelength. In this recording system, it is necessary that a new short wavelength signal be recorded (overwritten) on the magnetic layer while a long wavelength signal such as servo signal recorded deep in the magnetic layer being erased by a short wavelength recording signal. Heretofore, a magnetic layer having an enhanced coercive force has been used to increase the short wavelength output. However, in the case where a digital video signal containing a long wavelength component is recorded, the coercive force of the magnetic layer cannot be raised without limitation from the standpoint of the foregoing overwritability.

In other words, a problem has arisen that the distribution of coercive force in the magnetic layer must be controlled so that written signals can be erased when overwriting is effected at a high output in a long wavelength range even in a short wavelength recording for high density recording.

JP-A-5-109061 discloses that a ferromagnetic metal powder is preferably used as a magnetic material for the purpose of improving the overwritability in digital recording on a magnetic disk having a magnetic layer thickness of not more than 0.5 µm and a coercive force of not less than 1,400 Oe (oersted). JP-A-5-120676 discloses a proposal similar to that described above.

JP-A-5-242462, JP-A-5-274651, and JP-A-5-290359 disclose that a magnetic recording medium having excellent high band characteristics, overwritability, corrosion resistance and light transmission in the form of 8 mm video tape consisting of an upper magnetic layer and a lower nonmagnetic or high permeability layer can be provided.

However, JP-A-63-187418 discloses the reduction of a magnetic layer to not more than 2 µm but does not refer to the foregoing requirement for overwritability. JP-A-5-109061 and JP-A-5-120676 do not refer to controlling the distribution of coercive force in the magnetic layer to improve the overwritability.

JP-A-5-242462, JP-A-5-274651, and JP-A-5-290359 disclose improvements in overwritability. However, the short wavelength signal and long wavelength signal which are overwritable are actually such that the ratio of the former to the latter is small as 4.5, e.g., 2 MHz and 9 MHz. Further, there is no reference to the foregoing problem. Thus, the requirement that a signal having a wavelength as short as 0.5 µm can be secured at a high output while a servo signal having a wavelength of 45 times that of the former is being recorded cannot be met.

SUMMARY OF THE INVENTION

It is therefore an object of the present invention to provide a magnetic recording medium which exhibits improvements in the erasability and overwritability of digital video signal which can be hardly attained when a short wavelength signal containing a long wavelength component is recorded on a coating type magnetic recording medium comprising a ferromagnetic metal powder.

The foregoing and other objects and effects of the present invention will become more apparent from the following detailed description and examples.

The present invention relates to, as a first embodiment, a magnetic recording medium comprising a nonmagnetic support having thereon a magnetic layer comprising a ferromagnetic metal powder and a binder resin, wherein the magnetic layer exhibits a coercive force of from 2,000 to 3,000 Oe, and has a thickness of from 0.05 to 0.3 µm, a surface roughness of from 1 to 3 nm, and the proportion of magnetizable components that are inverted by an external magnetic field of not less than 3,000 Oe in the magnetic layer is from 1% to (0.0225×(coercive force of magnetic layer)−38)% as determined by the remanence curve of the magnetic layer.

The present invention also relates to, as a second embodiment, a magnetic recording medium comprising a nonmagnetic support having in this order thereon a nonmagnetic layer comprising a nonmagnetic material powder and a binder, and a magnetic layer comprising a ferromagnetic metal powder and a binder resin, wherein the magnetic layer exhibits a coercive force of from 2,000 to 3,000 Oe, and has a thickness of from 0.05 to 0.3 µm, a surface roughness of from 1 to 3 nm, and the proportion of magnetizable components that are inverted by an external magnetic field of not less than 3,000 Oe in the magnetic layer is from 1% to (0.0225×(coercive force of magnetic layer)−38)% as determined by the remanence curve of the magnetic layer.

The inventors made studies of the relationship between various properties and overwritability of a magnetic layer in a magnetic recording medium comprising a ferromagnetic metal powder for recording a video signal containing a long wavelength component thereon. As a result, it was found that the magnetic layer needs to have a coercive force (hereinafter referred to as "Hci") of from 2,000 to 3,000 Oe, a thickness of from 0.05 to 0.3 µm and a surface roughness of from 1 to 3.0 nm to secure a sufficient short wavelength output and compatibility of metal evaporated tape with recording current to make up the system.

It was further found that when the proportion of magnetizable components that are inverted by an external magnetic field of not less than 3,000 Oe in said magnetic layer is not more than (0.0225×Hci−38)% as determined by the remanence curve of the magnetic layer, the system can be made up and a sufficient C/N can be secured even if a short wavelength digital video signal containing a long wavelength component is overwritten. Thus, the present invention has been worked out.

BRIEF DESCRIPTION OF THE DRAWING

By way of example and to make the description more clear, reference is made to the accompanying drawing in which.

DETAILED DESCRIPTION OF THE INVENTION

The first and second embodiments of the magnetic recording medium of the present invention are not specifically limited and may assume any constitution so far as the foregoing requirements are satisfied. In some detail, the magnetic layer and/or the nonmagnetic layer may consist of a single layer or a plurality of layers. In the present invention, the thickness of the magnetic layer constituted by a plurality of layers represents the total thickness of the magnetic layers.

In the present invention, if the coat layer consists of a plurality of layers, a wet-on-wet process described later is preferably used.

In the present invention, Hci is from 2,000 to 3,000 Oe, preferably from 2,000 to 2,600 Oe, most preferably from 2,200 to 2,400 Oe.

If Hci falls below 2,000 Oe, a short wavelength output necessary for system arrangement cannot be secured, and the metal evaporated tape cannot be compatible in terms of the recording current. If Hci exceeds 3,000 Oe, the head for use in recording is saturated, and a required output cannot be secured.

The thickness of the magnetic layer of the present invention is from 0.05 to 0.3 µm, preferably from 0.05 to 0.25 µm, more preferably from 0.10 to 0.20 µm.

If the thickness of the magnetic layer falls below 0.05 µm, the magnetic layer has insufficient magnetic flux, making it impossible to secure a required output, and it causes a reduced productivity. If the thickness of the magnetic layer exceeds 0.3 µm, it results in deteriorated output and overwritability.

In the present invention, the thickness of the magnetic layer is defined as average determined on the electron photomicrograph of a section of the magnetic recording medium.

The surface roughness of the magnetic layer of the present invention is from 1 to 3 nm, preferably from 1 to 2.5 nm, more preferably from 1 to 2.0 nm.

The surface roughness of the magnetic layer is preferably small so far as required running properties can be secured from the standpoint of maintenance of output and overwritability. The surface roughness of the magnetic needs to be not more than 3.0 nm. If the surface roughness of the magnetic layer exceeds 3.0 nm, the resulting spacing loss brings about deterioration in both output and overwritability, and in particular, it is difficult to overwrite a short wavelength signal on a long wavelength component recorded deep in the magnetic layer.

For the measurement of surface roughness, a light interference three-dimensional roughness meter "TOPO-3D" available from WYKO (Arizona, U.S.A.) may be used. The specimen is measured over an area of 250 μm square. For the calculation of measurements, corrections such as inclination correction, spherical surface correction and cylinder correction are made according to JIS-B601 so that the central surface average roughness RaI is defined as surface roughness.

With the coercive force of the magnetic layer as a variable, a magnetic recording medium comprising a ferromagnetic metal powder having a thickness of from 0.05 to 0.3 μm and a surface roughness of from 1 to 3.0 nm was subjected to the comparison in overwritability, coercive force distribution (SFD determined from the differentiation curve of the magnetization curve; SFDr determined from the remanence curve), and proportion of magnetizable components that can be inverted by an external magnetic field on the remanence curve of the magnetic layer (hereinafter referred to as "percent residue of inverted magnetizable components $\Delta M$"). As a result, it was found that the overwritability of a magnetic recording medium shows a good correspondence to $\Delta M$ for the specific magnetic field, i.e., 3,000 Oe or more, in a specific coercive force range of magnetic layer, i.e., 2,000 to 3,000 Oe. In other words, the more the coercive force of a magnetic recording medium is, the more is $\Delta M$. Taking into $\Delta M$ for an external magnetic field of not less than 3,000 Oe (hereinafter referred to as "$\Delta M$ (%) of the present invention"), when $\Delta M$ is from 1 to $(0.0225 \times Hci-38)\%$, an overwritability necessary for system arrangement can be secured. The less $\Delta M$ is, the better is the overwritability. Therefore, the lower limit of $\Delta M$ is ideally 0, but it is practically 1. In the present invention, $\Delta M$ is preferably from 1 to $(0.0200 \times Hci-30)\%$, more preferably from 1 to $(0.0125 \times Hci-20)\%$.

In the present invention, the magnetic layer is controlled such that the coercive force, thickness, surface roughness and percent residue of oppositely magnetizable components are from 2,000 to 3,000 Oe, from 0.05 to 0.3 μm, from 1.0 to 3.0 nm and from 1 to $(0.0225 \times Hci-38)\%$, respectively. In such an arrangement, the proportion of components that can be inverted in magnetization in a high external magnetic field as viewed on the remanence curve is minimized, that is, the proportion of magnetized components left demagnetized in a high external magnetic field is minimized so that written long wavelength signals can be erased when overwriting is effected at a high output even in short wavelength recording.

It was found that the coating type magnetic recording medium of the present invention is most suitable for, e.g., DVC system proposed as digital VTR system for metal evaporation tape having the foregoing constitution. Besides DVC system, the coating type magnetic recording medium of the present invention is useful for-a system having the following features:

(1) Recording of short wavelength signal having a recording wavelength of not more than 0.6 μm;

(2) The recording wavelength of servo signal is 30 or more times that of recording signal;

(3). Recording signal and servo signal are simultaneously recorded; and (4) Signals (3) are partially overwritten The servo signal used herein means a control signal which is generally used to indicate the position of recording signal. In the feature (4), the area to be overwritten is a part of the width of a predetermined track on which recording has been made in the feature (3). The overwriting recording signal preferably consists of a short wavelength recording signal only. The width of the overwriting area is generally from 10 to 80%, preferably from 10 to 60%, of that of the magnetic head. If the width of the overwriting area falls below 10% of that width of the magnetic head or exceeds 80% of that of the magnetic head, it is not preferred since it is difficult to secure the required precision of tracking.

The width of the track is generally from 5 to 20 μm, preferably from 5 to 15 μm. The width of the magnetic head is generally from 5 to 25 μm, preferably from 10 to 20 μm. The width of the track and the magnetic head may be almost the same or different. Preferably, the width of the magnetic head is preferably slightly more than that of the track.

In some detail, in DVC system, the tape width and thickness are ¼ in. and 7 μm, respectively. The track width is 10 μm. The magnetic head width is 15 μm. The overwriting width is 5 μm. The wavelength of short wavelength signal to be recorded is 0.5 μm. The wavelength of servo signal is 22.5 μm.

Specific examples of preferable methods for obtaining the coating type magnetic recording medium of the present invention include the following embodiments:

(1) The particle size or composition of ferromagnetic metal powder are made uniform for the purpose of making the distribution of coercive force in the magnetic layer sharp.

As a ferromagnetic metal powder, a ferromagnetic metal powder of goethite having a uniform particle size (see the examples described later for details) as well as monodisperse hematite are preferably used.

(2) A ferromagnetic metal powder in finely divided form is used for the purpose of improving the surface properties.

In order to enhance the dispersibility of the ferromagnetic metal powder, a polar group-containing binder may be used. Further, in order to facilitate the surface formation treatment of the magnetic layer, calender rolls comprising a combination of metal rolls may be used.

(3) A magnetic layer which is thin but uniform in thickness distribution is formed.

In the most preferred embodiment, the magnetic layer and the nonmagnetic layer are applied by a wet-on-wet process described layer.

In order to provide a ferromagnetic metal powder for producing a magnetic layer having a small $\Delta M$, the improvement of the particle size distribution, the improvement of the uniformity of the metal powder composition, and the treatment for inhibiting sintering are preferably effected.

In order to improve the particle size distribution, the particle size of the ferromagnetic metal powder is preferably rendered monodisperse. To this end, the particles, which have been produced as nuclei, are preferably ripened to make the particle size distribution thereof uniform, followed by the growth reaction.

In order to make the metal powder composition uniform, it is preferred that alloying elements and a sintering inhibitor be uniformly applied to the surface of the particles to produce hematite or magnetite, which is then thoroughly annealed so that the alloying elements are dispersed in the particles.

The measurement of ΔM of the present invention is effected as follows: The magnetic recording medium sample to be measured is placed on a vibration sample magnetometer available from Toei Kogyo K.K., Japan in such an arrangement that the direction of orientation of the sample is the same as that of the magnetic field. A magnetic field of −10 kOe is applied to the sample. The magnetic field is then returned to zero. The sample is then measured for residual magnetization (−Mrmax). A magnetic field of 3,000 Oe is then applied to the sample in the opposite direction. The magnetic field is then returned to zero, to measure residual magnetization Mr. A magnetic field of 10 kOe is then applied to the sample so that magnetization is saturated in the opposite direction. The magnetic field is then returned to zero, to measure residual magnetization Mrmax.

From the residual magnetization values above, ΔM can be calculated according to the following equation:

$$\Delta M\ (\%)\ \text{of the present invention} = 100 \times (Mrmax - Mr)/(Mrmax - (-Mrmax)) \quad (1)$$

The magnitude of the magnetic field to be applied in the opposite direction can be arbitrarily predetermined. In the present invention, a magnetic field of 3,000 Oe is employed from the standpoint of detection sensitivity. In the present invention, the percent residue of inverted magnetizable components represents the proportion of components which are inversely magnetized in the predetermined applied magnetic field, i.e., 3,000 Oe.

Figure 1:
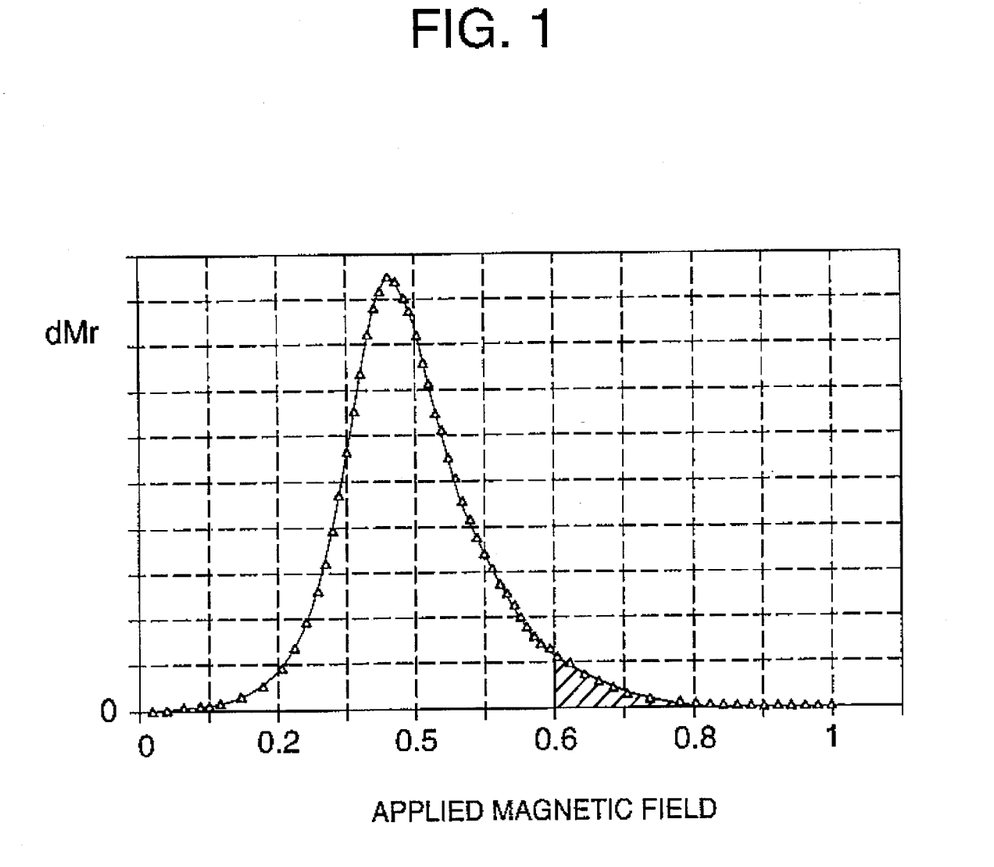
FIGURE 1 is an inverted magnetic field distribution curve representing a remanence curve after saturation, wherein the ordinate indicates the difference in residual magnetization (dMr) and the abscissa indicates the applied magnetic field (with 5,000 Oe being standardized as 1), the total area surrounded by the curve being 100%.

In other words, under these measurement conditions, in an inverted magnetic field distribution curve representing a remanence curve after saturation as shown in FIGURE 1 (the ordinate indicates the difference in residual magnetization (dMr) and the abscissa indicates the applied magnetic field (with 5,000 Oe being standardized as 1)), ΔM corresponds to the percent proportion of the area of dMr above an applied voltage of 0.6 (i.e., not less than 3,000 Oe) in the area surrounded by the curve and the abscissa.

The measurement of overwritability can be effected as follows: A drum tester is used, and relative speed of TSS head (sendust head for 8 mm video camera available from Sony Corp.; head gap: 0.2 μm; track width: 14 μm; saturated magnetic flux density: 1.1 tesla) is adjusted to 10.2 m/sec. The optimum recording current is determined according to the input/output characteristics at ½ Tb (λ=0.5 μm). With this optimum recording current, a signal having 1/90 Tb (λ=22.5 μm) is recorded, and from the percent erasure of a signal having 1/90 Tb when overwritten by a signal having ½ Tb, the overwritability is determined.

The composition of the ferromagnetic metal powder to be incorporated in the magnetic layer of the present invention is not specifically limited. Preferably, a ferromagnetic metal powder mainly composed of Fe, Ni and/or Co (in an amount of not less than 75%), which is generally used in high recording density medium, is employed.

The length of the major axis of the particles of the ferromagnetic metal powder is generally from 0.04 to 0.20 μm, preferably from 0.05 to 0.15 μm. It is most preferably from 0.05 to 0.10 μm to satisfy both the two requirements, i.e., the maximization of the saturation magnetization of the ferromagnetic metal powder and the minimization of the surface roughness of the magnetic recording medium. The acicular ratio of the particles of the ferromagnetic metal powder is generally from 5 to 15. It is preferably from 5 to 10 to maximize the saturation magnetization of the ferromagnetic metal powder. The crystalline size of the ferromagnetic metal powder is generally from 100 to 300 Å, preferably from 120 to 200 Å. If the crystalline size is too small, the saturation magnetization cannot be maximized. If the crystalline size is too great, it adds to noise, making it impossible to secure desired C/N.

Besides the predetermined elements, the foregoing ferromagnetic metal powder which can be employed in the present invention may contain elements such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Mn, Zn, Sr and B in an amount of not more than 20% by weight.

The ferromagnetic alloy powder may contain a small amount of a hydroxide or oxide. The finely divided ferromagnetic alloy powder may be obtained by any known preparation method. As well known, a ferromagnetic alloy powder may be provided with an oxidized layer on the surface thereof by gradual oxidation, so that it is chemically stable. The gradual oxidization treatment may be effectively preceded by the treatment of the ferromagnetic metal powder with a compound disclosed in JP-A-61-52327 or a compound containing an amino group and/or double bond capable of forming a polysiloxane film upon polymerization, to enhance the saturation magnetization of the ferromagnetic alloy powder.

The ferromagnetic alloy powder to be incorporated in the magnetic layer of the magnetic recording medium of the present invention generally has a specific surface area of from 40 to 80 m²/g, preferably from 45 to 70 m²/g, as determined by BET method. If the specific surface area falls below 40 m²/g, noise may increase. If the specific surface area exceeds 80 m²/g, it tends to be difficult to disperse the ferromagnetic alloy powder and hence provide a smooth magnetic layer surface.

The saturation magnetization (σs) of the ferromagnetic metal powder of the present invention is generally not less than 115 emu/g, preferably not less than 120 emu/g. It is more preferably from 130 emu/g to 170 emu/g to provide a desired output even if the magnetic layer is thin. The coercive force of the ferromagnetic metal powder is generally from 1,700 to 3,000 Oe, preferably from 1,800 to 3,000 Oe. It is more preferably from 1,900 to 2,500 Oe because of the limit of the saturation magnetic flux of the magnetic recording head.

The ferromagnetic metal powder may be previously treated with a dispersant, a lubricant, a surface active agent, or an antistatic agent described later, prior to dispersion. For details, reference can be made to JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, U.S. Pat. Nos. 3,026,215, 3,031,341, 3,100,194, 3,242,005, and 3,389,014.

The water content of the ferromagnetic metal powder is preferably from 0.01 to 2% by weight. The water content of the ferromagnetic metal powder is preferably optimized depending on the kind of the binder described later.

If the ferromagnetic metal powder is a ferromagnetic alloy powder, its tap density is preferably from 0.2 to 0.8 g/cc. If the tap density exceeds 0.8 g/cc, the ferromagnetic metal powder may not be uniformly gradually oxidized, making it difficult to handle the ferromagnetic metal powder without degradation, or causing a drop in the magnetization of the resulting medium with the lapse of time. If the tap density falls below 0.2 cc/g, it tends to cause an insufficient dispersion.

Examples of the binder resin to be incorporated in the magnetic layer of the magnetic recording medium of the present invention include a known thermoplastic resin, thermosetting resin or reactive resin, singly or in admixtures.

Examples of the thermoplastic resin include those having a glass transition temperature of from $-100°$ C. to $150°$ C., a number-average molecular weight of from 1,000 to 200,000, preferably from 10,000 to 100,000, and a polymerization degree of from about 50 to about 1,000. Examples of the thermoplasitc resins include polymers or copolymers containing as constituent units vinyl chloride, vinyl acetate, vinyl alcohol, maleic acid, acrylic acid, acrylates, vinylidene chloride, acrylonitrile, methacrylic acid, methacrylates, styrene, butadiene, ethylene, vinyl butyral, vinyl acetal, vinyl ether, etc.; polyurethane resins; and various rubber resins.

Examples of the thermosetting resins or reactive resins include phenol resins, epoxy resins, polyurethane hardening resins, urea resins, melamine resins, alkyd resins, acrylic reactive resins, formaldehyde resins, silicone resins, epoxy-polyamide resins, mixtures of a polyester resin and a isocyanate prepolymer, mixtures of a polyester polyol and a polyisocyanate, and mixtures of a polyurethane and a polyisocyanate.

If necessary, at least one polar group selected from the group consisting of COOM, $SO_3M$, $OSO_3M$, $P=O(OM)_2$, $O—P=O(OM)_2$ (in which M is a hydrogen atom or an alkaline metal for forming a salt), OH, $NR_2$, $N^+R_3$ (in which R is a hydrocarbon group), epoxy group, SH, and CN is preferably introduced into the binder resin by copolymerization or addition reaction, to obtain a better effect of dispersing ferromagnetic metal powder and a higher durability of the magnetic layer. The amount of such a polar group is generally in the range of from $1\times10^{-1}$ to $1\times10^{-8}$ mol/g, preferably from $1\times10^{-2}$ to $1\times10^{-6}$ mol/g.

The binder resin to be incorporated in the magnetic recording medium of the present invention is generally used in an amount of from 5 to 50% by weight, preferably from 10 to 30% by weight, based on the weight of the ferromagnetic metal powder. If a vinyl chloride series resin is used, its content is preferably in the range of 5 to 100% by weight, based on the weight of the ferromagnetic metal powder. If a polyurethane series resin is used, its content is preferably in the range of 2 to 50% by weight, based on the weight of the ferromagnetic metal powder, and the content of a polyisocyanate is preferably in the range of 2 to 100% by weight, based on the weight of the ferromagnetic metal powder.

The packing of the ferromagnetic metal powder in the magnetic can be calculated as $(Bm/4\pi\sigma s)$ from the maximum saturation magnetization $\sigma s$ and the maximum magnetic flux density Bm of the ferromagnetic-metal powder used. In the present invention, the packing of the ferromagnetic metal powder is preferably not less than 1.9 g/cc, more preferably not less than 2.0 g/cc, most preferably not less than 2.2 g/cc.

In the present invention, if a polyurethane series resin is used as a binder, its glass transition temperature is preferably $-50°$ to $100°$ C., its breaking elongation is preferably 100 to 2,000%, its breaking stress is preferably 0.05 to 10 kg/cm$^2$, and its yield point is preferably 0.05 to 10 kg/cm$^2$.

Examples of polyisocyanates which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate,;products of the reaction of these isocyanates with polyalcohols; and polyisocyanates produced by the condensation of isocyanates. Examples of the trade names of these commercially available isocyanates include Colonate L, Colonate HL, Colonate 2030, Colonate 2031, Millionate MR and Millionate MTL available from Nihon Polyurethane, Takenate D-102, Takenate D-110N, Takenate D-200 and Takenate D-202 available from Takeda Chemical Industries, Ltd., and Desmodur L, Desmodur IL, Desmodur N and Desmodur HL available from Sumitomo Bayer. These isocyanates may be used singly. Alternatively, by making the best use of the difference in hardening reactivity, two or more of these isocyanates can be used in combination.

The magnetic layer of the magnetic recording medium of the present invention may contain various functional materials such as a lubricant, an abrasive, a dispersant, an antistatic agent, a plasticizer, and an anit-mildew agent incorporated therein depending on the purpose.

Examples of the lubricant which can be incorporated in the magnetic layer of the present invention include silicone oils such as dialkyl polysiloxane (containing $C_{1-5}$ alkyl), dialkoxy polysiloxane (containing $C_{1-4}$ alkoxy), monoalkyl monoalkoxy polysiloxane (containing $C_{1-5}$ alkyl and $C_{1-4}$ alkoxy), phenyl polysiloxane, and fluoroalkyl polysiloxane (containing $C_{1-5}$ alkyl); finely divided powder of electrically conductive material such as graphite; powder of inorganic material such as molybdenum disulfide and tungsten disulfide; finely divided powder of plastics such as polyethylene, polypropylene, ethylene-vinyl chloride copolymers, and polytetrafluoroethylene; α-olefin polymers; unsaturated aliphatic hydrocarbons which are liquid at room temperature (e.g., compound having n-olefin double bond connected to terminal carbon; number of carbon atoms: about 20); aliphatic esters made of $C_{12-20}$ monobasic aliphatic acid and $C_{3-12}$ monovalent alcohol; and fluorocarbons.

Most preferred among these lubricants is an aliphatic ester. Examples of the alcohol to be used as a starting material of the aliphatic ester include monovalent alcohols such as ethanol, butanol, phenol, benzyl alcohol, 2-methyl butyl alcohol, 2-hexyldecyl alcohol, propylene glycol monobutyl ether, ethylene glycol monobutyl ether, dipropylene glycol monobutyl ether, diethylene glycol monobutyl ether and sec-butyl alcohol, and polyvalent alcohols such as ethylene glycol, diethylene glycol, neopentyl glycol, glycerin, and sorbitan derivative. Examples of the aliphatic acid to be used as a starting material of the aliphatic ester include aliphatic carboxylic acids such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, palmitoleic acid, and mixtures thereof.

Specific examples of the aliphatic esters include various ester compounds such as butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixture of butyl stearate and butyl palmitate, butoxyethyl stearate, 2-butoxy-1-propyl stearate, compound obtained by esterification of dipropylene glycol monobutyl ether with stearic acid, diethylene glycol dipalmitate, compound obtained by esterification of hexamethylenediol with myristic acid, and oleate of glycerin.

In order to reduce the hydrolysis of the aliphatic esters which often occurs when magnetic recording media are used under high humidity, the isomerism (cis/trans) and branch position (branch/straight chain) of aliphatic acids and alcohols as starting materials may be properly selected.

These types of the lubricant may be added in an amount of from 0.2 to 20 parts by weight per 100 parts by weight of the binder.

Further examples of lubricants which can be used in the present invention include silicone oils, graphite, molybdenum disulfide, boron nitride, fluorinated graphite, fluorine alcohol, polyolefin, polyglycol, alkylphosphoric ester, and tungsten disulfide.

Examples of an abrasive which may be incorporated in the ferromagnetic metal powder of the present invention include $Cr_2O$, $\alpha\text{-}Fe_2O_3$, $\alpha$-alumina and $\gamma$-alumina, the average particle diameter of which is not more than the thickness of the magnetic layer. The total amount of these abrasives to be added is generally from 1 to 20 parts by weight, preferably from 1 to 15 parts by weight, per 100 parts by weight of the magnetic material in the magnetic layer. If the total amount of the abrasives falls below 1 part by weight, it may not provide a sufficient durability. If the total amount of the abrasives exceeds 20 parts by weight, it tends to provide deteriorated surface properties and packing. The abrasives may be previously dispersed in a binder before being incorporated in a magnetic coating composition.

The magnetic layer of the magnetic recording medium of the present invention may contain a particulate electrically conductive material incorporated therein as an antistatic agent besides the foregoing nonmagnetic powder. However, in order to maximize the saturation magnetization of the uppermost layer, such an antistatic agent is preferably incorporated in the uppermost layer in an amount as small as possible. It is preferably incorporated in the other layers.

As such an antistatic agent, carbon black is preferably used to reduce the total surface electrical resistivity of the medium. Examples of the carbon black include furnace black for rubber, thermal black for rubber, black for color, electrically conductive carbon black, acetylene black, etc. The carbon black preferably has a specific surface area of 5 to 500 $m^2/g$, a DBP oil adsorption of 10 to 1,500 ml/100 g, an average particle diameter of 5 m$\mu$ to 300 m$\mu$, a pH value of 2 to 10, a water content of 0.1 to 10%, and a tap density of 0.1 to 1 g/cc. Specific examples of the carbon black to be used in the present invention include BLACKPEARLS 2000, 1300, 1000, 900, 800, 700, and VULCAN XC-72 produced by Cabot; #80, #60, #55, #50, and #35 produced by Asahi Carbon Co., Ltd.; #3950, #3250, #2400, #2300, #900, #1000, #30, and #10 produced by Mitsubishi Chemical Industries Ltd.; CONDUCTEX SC, RAVEN 150, 50, 40 and 15 produced by Columbia Carbon; and Ketchen Black EC, Ketchen Black ECDJ-500 and Ketchen Black ECDJ-600 produced by Agzo.

These carbon blacks may be surface-treated with a dispersant, acid-treated, grafted with a resin, or partially converted its surface to graphite, before use. These carbon blacks may be previously dispersed in a binder before added to the magnetic coating composition. The amount of carbon black, if incorporated in the magnetic layer, is preferably from 0.1 to 30% by weight based on the weight of the magnetic material in the magnetic layer. The nonmagnetic layer described later preferably comprises the carbon black incorporated in an amount of from 3 to 20% by weight based on the total weight of the nonmagnetic powder.

In general, carbon black not only serves to inhibit the electrification of the magnetic layer but also serves to reduce the coefficient of friction of the magnetic layer with the magnetic head, give light shielding effect, and improve film strength. Different carbon blacks are different in these effects. Accordingly, the kind, amount and combination of these carbon blacks can be properly altered depending on the purpose in the light of the foregoing various properties such as particle size, oil absorption, electrical conductivity and pH. For carbon black employable in the present invention, reference can be made to, e.g., "Carbon Black Binran" (Handbook of Carbon Black), edited by Carbon Black Association, Japan.

Two or more coat layers-(such as magnetic layers and nonmagentic layers) may be effectively formed on the nonmagnetic support to prepare a magnetic recording medium for high recording density. The simultaneous coating method is particularly desirable for the preparation of an ultrathin magnetic layer. Specific examples of the wet-on-wet coating method which can be employed as such a simultaneous coating method include the following methods:

(1) Method which comprises coating a lower layer by means of a gravure coating apparatus, roll coating apparatus, blade coating apparatus or extrusion coating apparatus commonly used for magnetic coating, and then coating an upper layer on the lower layer by means of a nonmagnetic support pressure type extrusion coating apparatus disclosed in JP-B-1-46186, and JP-A-60-238179 and JP-A-2-265672 while the lower layer is wet;

(2) Method which comprises coating a lower layer coating composition and the upper layer coating composition substantially simultaneously by means of a coating head incorporating two coating composition passage slits as disclosed in JP-A-63-88080, JP-A-2-17971, and JP-A-2-265672; and (3) Method which comprises coating the lower layer coating composition and the upper layer coating composition substantially simultaneously by means of an extrusion coating apparatus with a back-up roll as disclosed in JP-A-2-174965.

If the wet-on-wet process is used to apply a nonmagnetic layer as a lower layer and a magnetic layer as an upper layer to a nonmagnetic support, the flowing property of the magnetic layer coating composition and the nonmagnetic layer coating composition are preferably close to each other as much as possible, to provide a magnetic layer having a uniform thickness free of disturbance of interface between the nonmagnetic layer and the magentic layer. The flowing property of the coating composition greatly depends on the combination of the particles and the binder resin in the coating composition. The selection of the nonmagnetic powder to be incorporated in the nonmagnetic layer may preferably be effected in view of the flowing property.

The nonmagnetic powder to be incorporated in the nonmagnetic layer of the magnetic recording medium of the present invention may be selected from the group consisting of inorganic compounds such as metal oxide, metal carbonate, metal sulfate, metal nitride, metal carbide and metal sulfide, and carbon black. Preferably, a mixture of carbon black and such an inorganic compound may be used. Examples of the inorganic compound include $\alpha$-alumina having a percent $\alpha$-conversion of not less than 90%, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, and acicular $\alpha$-iron oxide obtained by dehydrating and annealing a starting material of magnetic iron oxide, optionally followed by the surface treatment with alumina and/or silica. These inorganic compounds may be used, singly or in combination.

The particle size of the nonmagnetic powder is generally from 0.01 to 2 μm, preferably from 0.015 to 1.00 μm, more preferably from 0.015 to 0.50 μm. If necessary, nonmagnetic powders having different particle sizes may be used in combination. Alternatively, a single nonmagnetic powder having a wider particle diameter distribution can be used to exert the similar effect. The tap density of the nonmagnetic powder is generally from 0.05 to 2 g/cc, preferably from 0.2 to 1.5 g/cc. The water content of the nonmagnetic powder is generally from 0.1 to 5%, preferably from 0.2 to 3%. The pH value of the nonmagnetic powder is generally from 2 to 11. The specific surface area of the nonmagnetic powder is generally from 1 to 200 $m^2/g$, preferably from 5 to 100 $m^2/g$, more preferably from 7 to 80 $m^2/g$. The crystalline size of the nonmagnetic powder is generally from 0.01 to 2 μm, preferably from 0.015 to 1.00 μm, more preferably from 0.015 to 0.50 μm. The DBP oil absorption of the nonmagnetic powder is generally from 5 to 100 ml/100 g, preferably from 10 to 80 ml/100 g, more preferably from 20 to 60 ml/100 g. The specific gravity of the nonmagnetic powder is generally from 1 to 12, preferably from 2 to 8. The crystal form of the nonmagnetic powder may be any of needle, sphere, cube and tablet.

These nonmagnetic powder does not necessarily need to be 100% pure but may be surface-treated with other compounds depending on the purpose. When the purity of the nonmagnetic powder which has thus been surface-treated is not less than 70%, the desired effects can be maintained. For example, titanium oxide is generally surface-treated with alumina. The ignition loss of the nonmagnetic powder is preferably not more than 20%. The Mohs hardness of the foregoing inorganic powder used in the present invention is preferably not less than 4.

Specific examples of the nonmagnetic powder employable in the present invention include US5600 and UA5605 available from Showa Denko K.K., AKP-20, AKP-30, AKP-50, HIT-50, HIT-100 and ZA-G1 available from Sumitomo Chemical Co., Ltd., G5, G7 and S-1 available from Nippon Chemical Industrial Co., Ltd., TF-100, TF-120 and TF-140 available from Toda Kogyo Corp., TTO-51B, TTO-55A, TTO-55B, TTO-55C, TTO-55S, TTO-55D, FT-1000, FT-2000, FTL-100, FTL-200, M-1, S-1 and SN-100 available from Ishiharara Sangyo kaisha, Ltd., ECT-52, STT-4D, STT-30D, STT-30 and STT-65C available from Titan Kogyo K.K., T-1 available from Mitsubishi Materials Corp., NS-O, NS-3Y and NS-8Y available from Nippon Shokubai Co., Ltd., MT-100S, MT-100T, MT-150W, MT-500B, MT-600B and MT-100F available from Tayca Corp., FINEX-25, BF-1, BF-10, BF-20, BF-1L and BF-10P available from Sakai Chemical Industry Co., Ltd., DEFIC-Y and DEFIC-R available from Dowa Mining Co., Ltd., and Y-LOP available from Titan Kogyo K.K.

Examples of carbon black to be used in combination with the nonmagnetic powder include furnace black for rubber, thermal black for rubber, black for color, and acetylene black. Such carbon black generally has a specific surface area of from 100 to 500 $m^2/g$, preferably from 150 to 400 $m^2/g$, DBP oil adsorption of from 20 to 400 ml/100 g, preferably from 30 to 200 ml/100 g, a particle diameter of from 5 mμ to 80 mμ, preferably from 10 to 50 mμ, more preferably from 10 to 40 mμ, a pH value of from 2 to 10, a water content of from 0.1 to 10%, and a tap density of 0.1 to 1 g/cc. Specific examples of carbon black to be used in the present invention include BLACKPEARLS 2000, 1300, 1000, 900, 800, 880, 700, and VULCAN XC-72 produced by Cabot, #3050, #3150, #3250B, #3750B, #3950B, #950, #650B, #970B, #850B, and MA-600 produced by Mitsubishi Chemical Industries Ltd., CONDUCTEX SC, RAVEN 8800, 8000, 7000, 5750, 5250, 3500, 2100, 2000, 1800, 1500, 1255 and 1250 produced by Columbia Carbon, and Ketchen Black EC produced by Akzo. These carbon blacks may be surface-treated with a dispersant, grafted with a resin or partially graphtized before use. Carbon black may be previously dispersed in a binder before being added to the coating composition. Carbon black may be used in an amount of from not more than 50% based on the amount of the inorganic powder and not more than 40% based on the total amount of the nonmagnetic layer. These carbon blacks can be used, singly or in combination. For carbon black employable in the present invention, reference can be made to "Carbon Black Binran" (Handbook of Carbon Black), edited by Carbon Black Association, Japan.

As the nonmagnetic powder incorporated in the nonmagnetic layer of the present invention, an organic powder may also be used, such as acrylstyrene resin powder, benzoguanamine resin powder, melamine resin powder, and phthalocyanine pigment. In particular, a polyolefin resin powder, polyester resin powder, polyamide resin powder, polyimide resin powder or polyethylene fluoride resin may be used. These organic powders can be prepared by any suitable method as disclosed in JP-A-62-18564 and JP-A-60-255827.

These nonmagnetic powders may be used in an amount of from 0.1 to 20 times that of the binder by weight or from 0.1 to 10 times that of the binder by volume.

In the present invention, the binder used in the magnetic layer of the magnetic recording medium may not essentially differ from that to be used in the nonmagnetic layer. The composition of the binder to be used in the magnetic layer is preferably the same as that of the binder used in the nonmagnetic layer, so that the flowing property of the nonmagnetic layer coating composition and the magnetic layer coating composition are close to each other, causing less turbulence in the layer interface.

The thickness of the nonmagnetic layer is generally from 0.5 to 5 μm, preferably from 1 to 3 μm.

The nonmagnetic support of the magnetic recording medium of the present invention generally has a thickness of from 1 to 100 μm, preferably from 3 to 20 μm. The nonmagnetic layer generally has a thickness of from 0.5 to 10 μm, preferably from 0.50 to 5.0 μm, more preferably from 0.50 to 3.0 μm.

Layers other than the magnetic layer and nonmagnetic layer may be additionally formed depending on the purpose so far as the magnetic layer is provided as an uppermost layer while the nonmagnetic layer is provided as a lower layer. For example, an interlayer such as undercoating layer for enhancing the adhesion between the nonmagnetic support and the lower nonmagnetic layer may be provided interposed between the nonmagnetic support and the lower nonmagnetic layer. The thickness of the interlayer is generally from 0.01 to 2 μm, preferably from 0.05 to 0.5 μm. A back coat layer may be provided on the side of the nonmagnetic support opposite the magnetic layer. The thickness of the back coat layer is generally from 0.1 to 2 μm, preferably from 0.3 to 1.0 μm. The interlayer and back coat layer may be made of any known materials. In the case of disc magnetic recording media, the layer constitution comprising the nonmagnetic layer and the magnetic layer may be provided on both sides of the support.

The nonmagnetic support used in the present invention is not specifically limited and may be made of any commonly used materials. Examples of the materials constituting the nonmagnetic support include film of various synthetic resins such as polyethylene terephthalate, polyethylene, polypropylene, polycarbonate, polyethylene naphthalate, polyamide, polyamide imide, polyimide, polysulfone and polyether sulfone, and metal foils such as aluminum foil and stainless steel foil.

In order to effectively accomplish the objects of the present invention, the nonmagnetic support preferably has a surface roughness of not more than 0.03 μm, more preferably not more than 0.02 μm, particularly not more than 0.01 μm as calculated in terms of average surface roughness on the center line (Ra) (cutoff value: 0.25 mm). Further preferably, these nonmagnetic supports not only have a small surface roughness on the center line but also are free of coarse protrusions having a size of not less than 1 μm. The roughness of the surface of these nonmagnetic supports can be freely controlled by the size and amount of fillers which are optionally added thereto. Examples of such fillers include oxides and carbonates of Ca, Si and Ti, and finely divided powder of organic resins such as acrylic resins. The nonmagnetic support to be used in the present invention preferably exhibits F-5 values of 5 to 50 kg/mm$^2$ in the web running (lengthwise) direction and 3 to 30 kg/mm$^2$ in the web width direction. In general, F-5 value in the web lengthwise direction is higher than F-5 value in the web width direction. However, if the crosswise strength of the nonmagnetic support needs to be high, the present invention is not limited to such specification.

The nonmagnetic support preferably exhibits a lengthwise and crosswise heat shrinkage of 3% or less, more preferably 1.5% or less at 100° C. for 30 minutes and 1% or less, more preferably 0.5% or less at 80° C. for 30 minutes. The breaking strength of the support is preferably in the range of 5 to 100 kg/mm$^2$ in both directions. The elastic modulus of the support is preferably in the range of 100 to 2,000 kg/mm$^2$ in both directions.

Examples of organic solvents which can be used for forming coating compositions in the present invention include ketones such as acetone, methyl ethyl ketone, methyl isobutyl ketone, diisobutyl ketone, cyclohexanone, isophorone and tetrahydrofuran, alcohols such as methanol, ethanol, propanol, butanol, isobutyl alcohol, isopropyl alcohol and methyl cyclohexanol, esters such as methyl acetate, butyl acetate, isobutyl acetate, isopropyl acetate, ethyl butyrate and glycol acetate, glycol ethers such as glycol dimethyl ether, glycol monoethyl ether and dioxane, aromatic hydrocarbons such as benzene, toluene, xylene, cresol and chlorobenzene, chlorinated hydrocarbons such as methylene chloride, ethylene chloride, carbon tetrachloride, chloroform, ethylene chlorohydrin and dichlorobenzene, N,N-dimethylformamide, and hexane. These organic solvents may be used in any proportions.

These organic solvents are not necessarily 100% pure and may contain impurities such as isomers, unreacted matters, side reaction products, decomposition products, oxides and water content besides main components. The content of these impurities is preferably in the range of 30% or less, more preferably 10% or less. If necessary, the kind and amount of organic solvents to be used in the present invention may be altered from the magnetic layer to the lower layer. For example, a highly volatile solvent may be used for the upper magnetic layer coating composition to improve the surface properties of the magnetic layer. Further, a solvent having a high surface tension (e.g., cyclohexanone, dioxane) can be used for the nonmagnetic layer coating composition to improve the coating stability. Moreover, a solvent having a high solubility parameter can be used for the nonmagnetic layer coating composition to enhance the packing density of the nonmagnetic layer. The solvent used in the present invention is not limited to these examples.

The magnetic recording medium of the present invention can be obtained by kneading the ferromagnetic metal powder and the binder resin with an organic solvent, optionally with other additives, to obtain a magnetic coating composition in the form of dispersion, applying the magnetic coating composition to a nonmagnetic support, optionally orienting the magnetic layer, anti,hen drying the coated layer. The magnetic coating composition may further comprise a nonmagnetic coating composition essentially made of a nonmagnetic powder is used instead of the ferromagnetic metal powder in the magnetic coating composition. In this case, a nonmagnetic coating composition is added in an amount of from 0.5 to 20 parts by weight, preferably from 1 to 15 parts by weight, in terms of the content of the nonmagnetic powder per 100 parts by weight of the content of the ferromagnetic metal powder, before treating with a sand grinder, and then subjected to fine dispersion.

The process for the preparation of the magnetic coating composition for the magnetic layer of the magnetic recording medium of the present invention comprises at least a kneading step and a dispersion step, as well as a mixing step which is optionally provided before or after these steps. These steps each may consist of two or more stages. The raw materials to be used in the present invention, e.g., ferromagnetic powder, binder resin, carbon black, abrasive, antistatic agent, lubricant and solvent, may be added to the system at any stage in any step. These raw materials each may be batchwise added to the system at two or more steps. For example, polyurethane may be batchwise added in the system at the kneading step, the dispersion step, and the mixing step for the viscosity adjustment after dispersion.

The kneading and dispersion of the magnetic coating composition can be accomplished by means of various kneaders. For example, two-roll mill, three-roll mill, ball mill, pebble mill, Trommel mill, sand grinder, Szegvari, attritor, high speed impeller dispersing machine, high speed stone mill, high speed impact mill, disper, kneader, high speed mixer, homogenizer, ultrasonic dispersing machine, etc. may be used.

The nonmagnetic coating composition used in the present invention can be prepared according to the method for the preparation of the magnetic coating composition.

In order to accomplish the objects of the present invention, a known preparation technique can be used as a part of the steps. In the kneading step, an apparatus having a strong kneading power such as continuous kneader and pressure kneader can be used to enhance the residual magnetic flux density (Br) of the magnetic recording medium of the present invention. If a continuous kneader or pressure kneader is used, the magnetic powder is kneaded with the whole or part of all binder resins in an amount of from 15 to 500 parts by weight per 100 parts by weight of the magnetic powder (preferably 30% by weight or more of the total weight). These kneading techniques are further described in JP-A-1-106388 and JP-A-64-79274. In the present invention, a simultaneous multi-layer coating method as disclosed in JP-A-62-212933 can be used to give a higher efficiency in the production of the magnetic recording medium.

The amount of the residual solvent in the magnetic layer of the magnetic recording medium of the present invention is preferably not more than 100 mg/m$^2$, more preferably not more than 10 mg/m$^2$. The residual solvent in the magnetic layer is preferably less than that in the nonmagnetic layer.

The magnetic recording medium of the present invention preferably has a porosity of not more than 30% by volume, more preferably not more than 10% by volume in both the lower layer and the uppermost layer. The porosity of the nonmagnetic layer are preferably greater than that of the magnetic layer. However, the porosity of the magnetic layer may be smaller than that of the nonmagnetic layer so far as the porosity of the nonmagnetic layer is not less than 5%.

The magnetic recording medium of the present invention may comprise a lower layer and an uppermost layer. It can easily be attained that the physical properties of the magnetic recording medium may be altered from the lower layer to the uppermost layer depending on the purpose. For example, the elasticity of the uppermost layer can be enhanced to improve the running durability thereof while the elasticity of the lower layer can be lower than that of the lower layer to improve the contact of the magnetic recording medium with the head.

The magnetic layer which has thus been applied to the support may be optionally treated such that the ferromagnetic metal powder contained therein is oriented, followed by drying. If necessary, the magnetic layer thus formed may be smoothened or cut into a desired shape to prepare a magnetic recording medium according to the present invention. The foregoing uppermost layer composition and lower layer composition are dispersed in a solvent.

As the surface smoothening process, a calender roll treatment may be used. Preferably, a combination of two metal rolls may be used. The metal roll has an extremely smooth and hard mirror-finished surface, and the surface of the magnetic layer can be formed to exhibit a high performance suitable for high density recording. The material of the metal roll may preferably be a hard chrome-plated chrome-molybdenum steel.

The magnetic layer preferably has an elastic modulus of from 100 to 2,000 Kg/mm$^2$ and a break strength of from 1 to 30 Kg/cm$^2$ at an elongation of 0.5% in both the web lengthwise direction and crosswise direction. The magnetic recording medium preferably has an elastic modulus of from 100 to 1,500 Kg/mm$^2$ in both the web lengthwise direction and crosswise direction, a residual elongation of not more than 0.5%, and a heat shrinkage of not more than 1%, more preferably not more than 0.5%, most preferably not more than 0.1%, at any temperatures below 100° C.

The magnetic recording medium of the present invention may be in the form of magenetic tape for use in video or audio recording or magnetic floppy disc or magnetic hard disc for use in data recording. The magnetic recording medium of the present invention is useful particularly for digital recording where the lack of signal due to the generation of dropout is fatal. By providing such an arrangement that a nonmagnetic layer is provided as a lower layer and the thickness of the uppermost layer is not more than 0.3 μm, a high density and large capacity magnetic recording medium which exhibits high electromagnetic characteristics can be obtained.

The present invention will be further described in the following examples, but the present invention should not be construed as being limited thereto.

Preparation of Ferromagnetic Metal Powder (1) Preparation of Sample Nos. A1-1 to A1-4

In a 150-l tank equipped with an agitator, a mixture of 35 l of a 1.7 mol/l ammonium carbonate and 15 l of a 2.0 mol/l aqueous ammonia was bubbled with nitrogen with 0.4 l of a 0.5 mol/l aqueous solution of citric acid added thereto. 40 l of an aqueous solution of ferrous sulfate and cobalt sulfate (Fe$^{2+}$ concentration: 1.35 mol/l; Co concentration: 0.3 mol/l) which had been bubbled with nitrogen to facilitate dissolution in a separate tank was added thereto while bubbling. The mixture was stirred over 10 minutes. The temperature of the resulting suspension was then adjusted to 40° C. to produce a precipitate containing ferrous iron. Air was then introduced into the suspension instead of nitrogen to oxidize the precipitate, to produce goethite nucleus crystals. When the concentration of Fe$^{2+}$ in the suspension reached 0.25 mol/l, air oxidation was terminated, and the gas to be bubbled was then changed to nitrogen. The suspension was heated to a temperature of 50° C. where it was then kept over 2 hours. The suspension was then cooled to 40° C., and then 1 l of a 1.1 mol/l aqueous solution of sodium aluminate was added thereto. The gas to be bubbled was then changed to air so that the suspension underwent oxidation reaction to produce spindle-shaped goethite particles. The particles thus obtained were recovered by filtration and then washed with water. A part of the particles was dried and observed under a transmission electron microscope to determine the average particle diameter thereof. The particels had an average major axis length of 0.15 μm and an average acicular ratio of 10. The particles were heated and dehydrated at a temperature of 120° C. over 30 minutes, and then measured for specific surface area. The result was 120 m$^2$/g.

The goethite thus obtained was then suspended in water to prepare a 2% slurry. To the slurry were then added an aqueous solution of yttrium chloride and then an aqueous solution of sodium aluminate as sintering inhibitors shown in Table 1 (yttrium chloride and sodium aluminate) with stirring In Table 1, the number of atoms of Al and Y is represented in terms of parts per 100 parts of iron atoms. The slurry was stirred over 20 minutes and then neutralized with diluted sulfuric acid. The resulting precipitate was recovered by filtration, washed with water, and then suspended in water to make a 5% slurry. The slurry was then heated to 120° C. over 2 hours. The resulting precipitate was recovered by filtration, and then washed with water to obtain a cake. The cake thus obtained was passed through a forming machine, and then dried to obtain a spindle-shaped sinter-proofed goethite particels.

The spindle-shaped goethite particles thus obtained was then put into a stationary reducing furnace. The geothite was heated to a temperature of 350° C. over 20 minutes so that it was dehydrated. The geothite was then heated to a temperature of 600° C. over 2 hours to enhance the crystallinity of hematite. The temperature was cooled to 470° C., and with the gas switched from nitrogen to hydrogen, the goethite was then reduced over 6 hours. With the gas changed to nitrogen, the ambient temperature was lowered to room temperature. The mixing ratio of air and nitrogen in the gas to be supplied was regulated such that the oxygen concentration reached 0.5%. In this gas atmosphere, the ferromagnetic metal powder was gradually oxidized while the temperature thereof was being monitored. When the heat generation stopped, the oxygen concentration was raised to 1% where the ferromagnetic metal powder was further oxidized. The oxygen concentration was further gradually raised in this manner, and the ferromagnetic metal powder was gradually oxidized with air. Thereafter, distilled water was carried over the ferromagnetic metal powder with air while being vaporized so that the ferromagnetic metal powder was moistened to gain a water content of 1% and stabilized.

The ferromagnetic metal-powder thus obtained was measured for magnetic characteristics in an external magnetic field of 10 KOe by means of a vibration sample magnetometer (available from Toei Kogyo K.K.). The ferromagnetic metal powder thus obtained was observed under a transmission electron microscope to determine the average particle diameter and the average acicular ratio thereof. The ferromagnetic metal powder was dehydrated at a temperature of 250° C. in nitrogen over 30 minutes, and then measured for specific surface area using Quantasob (available from Quanterchrome Corp.).

TABLE 1

| Sample No. | Sintering inhibitor Al | Sintering inhibitor Y | Hc (Oe) | σs (emu/g) | Specific surface area (m²/g) | major axis length (μm) | Acicular ratio |
|---|---|---|---|---|---|---|---|
| A1-1 | 7.5 | 2.0 | 1,850 | 135.0 | 56.0 | 0.08 | 7 |
| A1-2 | 10 | 2.0 | 2,035 | 136.5 | 56.2 | 0.085 | 7.5 |
| A1-3 | 10 | 4.0 | 2,255 | 138.0 | 56.5 | 0.085 | 7.5 |
| A1-4 | 12 | 6.0 | 2,470 | 135.5 | 57.0 | 0.090 | 8.0 |

(2) Preparation of Sample Nos. B1-1 to B1-4

Geothite was produced in the same manner as in the process (1) except that when the concentration of $Fe^{2+}$ in the suspension reached 0.25 mol/l after the production of geothite nucleus crystals, air oxidation was terminated, and the gas atmosphere was then changed to nitrogen. The suspension was heated to a temperature of 50° C. where it was immediately allowed to undergo the subsequent operation without being kept at that temperature. The geothite thus obtained showed an average particle diameter (major axis length) of 0.16 μm, an average acicular ratio of 11, and a specific surface area of 130 m²/g. The geothite was then treated with a sintering inhibitor. The geothite thus treated was then not subjected to heat treatment at a temperature of 120° C. over 2 hours but was immediately washed with water, recovered by filtration, and then dried. The ferromagnetic metal powder was obtained by reducing and gradually oxidizing in the same manner as in the process (1) to obtain samples as shown in Table 2.

TABLE 2

| Sample No. | Sintering inhibitor Al | Sintering inhibitor Y | Hc (Oe) | σs (emu/g) | Specific surface area (m²/g) | major axis length (μm) | Acicular ratio |
|---|---|---|---|---|---|---|---|
| B1-1 | 7.5 | 2.0 | 1,730 | 133.0 | 53.5 | 0.09 | 7.5 |
| B1-2 | 10 | 2.0 | 1,910 | 132.5 | 53.2 | 0.095 | 8.0 |
| B1-3 | 10 | 4.0 | 2,085 | 133.5 | 54.5 | 0.095 | 7.5 |
| B1-4 | 12 | 6.0 | 2,260 | 131.5 | 55.0 | 0.095 | 7.5 |

EXAMPLE 1

In order to prepare multi-layer magnetic tapes comprising the eight ferromagnetic metal powders obtained in the foregoing processes (1) and (2), the following magnetic layer coating composition and lower nonmagnetic layer coating composition were prepared.

| Magnetic layer coating composition | |
|---|---|
| Ferromagnetic metal powder | 100 parts |
| Binder resin | |
| Vinyl chloride copolymer (containing —$SO_3Na$ group in an amount of $1 \times 10^{-4}$ eq/g; polymerization degree: 300) | 12 parts |
| Polyester polyurethane resin (neopentyl glycol/caprolactone polyol/MDI = 0.9/ 2.6/1; containing —$SO_3Na$ in an amount of $1 \times 10^{-4}$ eq/g) | 5 parts |
| α-Alumina (average particle diameter: 0.13 μm) | 5.0 parts |
| Carbon black (average particle size: 40 nm) | 1.0 part |
| Butyl stearate | 1 part |
| Stearic acid | 2 parts |
| 1/1 Mixture of methyl ethyl ketone and cyclohexanone | 200 parts |

| Lower nonmagnetic layer coating composition | |
|---|---|
| Acicular hematite (specific surface area: 53 m²/g (as determined by BET method); average major axis length: 0.12 μm; acicular ratio: 8; pH: 6.3; alumina silica-treated; Al/Fe: 0.5 at. %; Si/Fe: 0.8 at. %) | 80 parts |
| Carbon black (average primary particle diameter: 17 nm; DBP oil absorption: 80 ml/100 g; specific surface area: 240 m²/g (as determined by BET method); pH: 7.5) | 20 parts |
| Binder resin | |
| Vinyl chloride copolymer (containing —$SO_3Na$ group in an amount of $1 \times 10^{-4}$ eq/g; polymerization degree: 300) | 12 parts |
| Polyester polyurethane resin (fundamental skeleton: 1,4-BD/phthalic acid/HMDI; molecular weight: 10,200; hydroxyl group: $0.23 \times 10^{-3}$ eq/g; —$SO_3Na$ group: $1 \times 10^{-4}$ eq/g) | 7 parts |
| Butyl stearate | 1 part |
| Stearic acid | 2.5 parts |
| 1/1 Mixture of methyl ethyl ketone and cyclohexanone | 200 parts |

The composition for the foregoing magnetic layer and the composition for the lower nonmagnetic layer were each kneaded by means of a kneader, and then subjected to dispersion by means of a sand grinder. To the dispersion for the lower nonmagnetic layer were added 5 parts of polyisocyanate. To the dispersion for the magnetic layer were added 6 parts of isocyanate. To the two dispersions were each added 20 parts of a 1/1 mixture of methyl ethyl ketone and cyclohexanone. These dispersions were each filtered through a filter having an average pore diameter of 1 μm to prepare a lower nonmagnetic layer coating composition and a magnetic layer coating composition.

The lower nonmagnetic layer coating composition and the magnetic layer coating composition thus obtained were then subjected to the following wet-on-wet simultaneous multilayer coating process. The lower nonmagnetic layer coating composition was applied to a 6-μm thick polyethylene naphthalate support to a dry thickness of 2 μm. The magnetic layer coating composition was immediately applied to the lower nonmagnetic layer thus applied, while it was wet, to a dry thickness of 0.2 μm. The laminate was then passed through an orientation apparatus while the two layers thus applied were wet so that it was longitudinally oriented. In this orientation process, the laminate was passed under a rare earth magnet (surface magnetic flux: 5,000 gauss), and was then passed under a solenoid magnet (magnetic flux density: 5,000 gauss) where it was dried to such an extent that the orientation thus gained cannot be erased. The magnetic layer was further dried, and the laminate was then wound in a roll. The laminate was then calendered by means of a 7-stage calender composed of metal rolls which had been adjusted to a temperature of 90° C. to obtain a web magnetic recording medium. The web magnetic recording medium thus obtained was slit into 8-mm video tape samples.

These samples were each measured for magnetic properties and ΔM by means of a vibration sample magnetometer. These samples were each also measured for surface roughness, electromagnetic characteristics (output, C/N) and overwritability (unit: dB). The results are set forth in Table 3. For the measurement of electromagnetic characteristics, a tape made of magnetic material B1-4 was used as a reference.

For the measurement of magnetic characteristics, a vibration sample magnetometer (available from Toei Kogyo K.K.) was used. The measurement was effected in an external magnetic field of 5 kOe. The direction of measurement was parallel to the direction of orientation. In Table 3, Hci, SQ, and Bm indicate the coercive force of the magnetic layer, the squareness ratio of the magnetic layer, and the maximum magnetic flux density of the magnetic layer (unit: gauss), respectively. ΔM was determined according to the equation (1).

For the measurement of surface roughness, a light interference three-dimensional roughness meter "TOPO-3D" available from WYKO (Arizona, U.S.A.) was be used. The specimen was measured over an area of 250 μm square. For the calculation of measurements, corrections such as inclination correction, spherical surface correction and cylinder correction were made according to JIS-B601 so that the central surface average roughness RaI is defined as surface roughness.

For the measurement of output (dB), a drum tester was used. The relative speed of TSS head (sendust head for 8 mm video camera available from Sony Corp.; head gap: 0.2 μm; track width: 14 μm; saturated magnetic flux density: 1.1 tesla) is adjusted to 10.2 m/sec. The optimum recording current is determined according to the input/output characteristics at ½ Tb (λ=0.5 μm). With this optimum recording current, measurement was made to determine output at ½ Tb.

For the measurement of C/N (unit: dB), outputs at ½ Tb and noise levels at frequencies deviated from ½ Tb by ±2.3 MHz determined under the same conditions were averaged.

For the measurement of overwritability (abbreviated as Ow), a drum tester was used. The relative speed of TSS head (sendust head for 8 mm video camera available from Sony Corp.; head gap: 0.2 μm; track width: 14 μm; saturated magnetic flux density: 1.1 tesla) was adjusted to 10.2 m/sec. The optimum recording current was determined according to the input/output characteristics at ½ Tb (λ=0.5 μm). With this current, a signal having 1/90 Tb (λ=22.5 μm) was recorded. From the percent erasure of a signal having 1/90 Tb when overwritten by a signal having ½ Tb, the overwritability was determined.

In Table 3 and Tables 4 and 5 described later, the upper limit of ΔM calculated from Hci for each of the samples is shown. Values of ΔM equal to or less than the upper limit are within the scope of the invention, whereas those more than the upper limit are outside the scope of the invention.

TABLE 3

| Magnetic powder | Magnetic characteristics | | | ΔM (%) | Surface roughness (nm) | Electromagnetic characteristics | | Ow | Upper limit of ΔM (%) |
|---|---|---|---|---|---|---|---|---|---|
| | Hci | Sq | Bm | | | Output | C/N | | |
| A1-1 | 2,020 | 0.84 | 3,950 | 7.3 | 2.5 | 1.5 | 1.8 | −11.0 | 7.45 |
| A1-2 | 2,150 | 0.85 | 4,000 | 9.0 | 2.6 | 1.8 | 2.3 | −9.5 | 10.375 |
| A1-3 | 2,390 | 0.85 | 4,050 | 11.2 | 2.6 | 2.5 | 2.8 | −7.7 | 15.775 |
| A1-4 | 2,630 | 0.86 | 3,960 | 13.8 | 2.5 | 2.7 | 2.8 | −6.5 | 21.175 |
| B1-1 | 1,890 | 0.82 | 3,500 | 6.3 | 3.2 | −2.2 | −2.6 | −4.5 | 4.525 |
| B1-2 | 2,040 | 0.81 | 3,430 | 10.7 | 3.3 | −1.6 | −2.1 | −3.5 | 7.9 |
| B1-3 | 2,230 | 0.82 | 3,550 | 17.0 | 3.3 | −0.5 | −0.7 | −2.0 | 12.175 |
| B1-4 | 2,420 | 0.81 | 3,360 | 21.3 | 3.2 | 0.0 | 0.0 | 0.0 | 16.45 |

Note:
A1-1 to A1-4 are samples according to the present invention, and B1-1 to B1-4 are comparative samples.

EXAMPLE 2

Samples having different magnetic layer thicknesses (unit: μm) were prepared in the same manner as in Example 1 except for the following conditions. The lower nonmagnetic layer coating composition, which was the same as prepared in Example 1, was supplied and applied to the support in such a manner that the dry thickness reached 1.5 μm. As the magnetic coating composition, one comprising the same ferromagnetic metal powder as used in A1-3 was used. The supply quantity of the magnetic coating composition was properly adjusted in the simultaneous multi-layer coating process to vary the thickness of the magnetic layer. Samples 2-1 to 2-4 were according to the present invention. Comparative Samples 2-1 and 2-2 were also prepared. Sample 1-3 corresponds to A1-3 in Example 1. These samples were evaluated.

Samples 3-1 and 3-2 were prepared. Sample 1-3 corresponds to A1-3 of Example 1. The magnetic recording medium samples thus obtained were then evaluated in the same manner as in Example 1. The results obtained are shown in Table 5.

TABLE 4

| Sample | Thickness of magnetic layer (μm) | Magnetic characteristics | | | ΔM (%) | Surface roughness (nm) | Electromagnetic characteristics | | Ow | Upper limit of ΔM (%) |
| --- | --- | --- | --- | --- | --- | --- | --- | --- | --- | --- |
| | | Hci | Sq | Bm | | | Output | C/N | | |
| Sample 2-1 | 0.06 | 2,350 | 0.87 | 4,150 | 10.8 | 2.9 | 1.0 | 1.0 | −12.0 | 14.875 |
| Sample 2-2 | 0.10 | 2,375 | 0.86 | 4,070 | 10.9 | 2.6 | 2.0 | 2.0 | −10.5 | 15.4375 |
| Sample 2-3 | 0.15 | 2,380 | 0.86 | 4,080 | 11.0 | 2.5 | 2.8 | 2.9 | −9.4 | 15.55 |
| Sample 1-3 | 0.20 | 2,390 | 0.85 | 4,050 | 11.2 | 2.6 | 2.5 | 2.8 | −7.7 | 15.775 |
| Sample 2-4 | 0.28 | 2,395 | 0.85 | 4,000 | 11.0 | 2.5 | 2.0 | 1.9 | −5.5 | 15.8875 |
| Comparative Sample 2-1 | 0.35 | 2,410 | 0.84 | 3,930 | 11.3 | 2.8 | 1.6 | 1.4 | −0.3 | 16.225 |
| Comparative Sample 2-2 | 0.50 | 2,420 | 0.83 | 3,850 | 11.5 | 3.1 | 1.3 | 1.2 | −1.5 | 16.45 |

It is understood from Table 4 that the thinner the magnetic layer is, the more is the surface roughness thereof. However, it is also understood that a thinner magnetic layer has a better overwritability. It is further understood that when the thick-

TABLE 5

| Sample | Average diameter of C.B. (nm) | Magnetic characteristics | | | ΔM (%) | Surface roughness (nm) | Electromagnetic characteristics | | Ow | Upper limit of ΔM (%) |
| --- | --- | --- | --- | --- | --- | --- | --- | --- | --- | --- |
| | | Hci | Sq | Bm | | | Output | C/N | | |
| Sample 3-1 | not added | 2,320 | 0.87 | 4,350 | 10.7 | 1.8 | 3.5 | 4.0 | −11.5 | 14.2 |
| Sample 3-2 | 17 | 2,355 | 0.86 | 4,180 | 10.9 | 2.4 | 2.8 | 3.3 | −9.7 | 14.9875 |
| Sample 3-3 | 30 | 2,370 | 0.86 | 4,120 | 11.0 | 2.5 | 2.8 | 2.8 | −8.0 | 15.325 |
| Sample 1-3 | 40 | 2,390 | 0.85 | 4,050 | 11.2 | 2.6 | 2.5 | 2.8 | −7.7 | 15.775 |
| Sample 3-4 | 55 | 2,390 | 0.84 | 4,060 | 11.1 | 2.8 | 1.9 | 1.7 | −5.0 | 15.775 |
| Comparative Sample 3-1 | 60 | 2,415 | 0.84 | 3,950 | 11.3 | 3.2 | 1.4 | 1.0 | −3.3 | 16.3375 |
| Comparative Sample 3-2 | 300 | 2,450 | 0.81 | 3,750 | 11.5 | 3.9 | 0.6 | 0.2 | −1.0 | 17.125 | ness of the magnetic layer exceeds 0.35 μm, a 1/90 Tb signal cannot be erased by a ½ Tb signal. Accordingly, the optimum thickness of the magnetic layer was found to be in the range of about from 0.10 to 0.30 μm.

EXAMPLE 3

Magnetic coating compositions were prepared from the same ferromagnetic metal powder as used in A1-3 except that carbon blacks (C.B.) having an average particle size different from that used in the magnetic layer of Example 1 were used (no carbon black was used in Sample 3-1). As the lower nonmagnetic layer coating composition, the same composition as in Example 1 was used. In the simultaneous multi-layer coating process, the lower nonmagnetic layer coating composition was supplied and applied to a support in such a manner that the dry thickness reached 2.0 μm. The magnetic layer coating composition was immediately applied to the lower nonmagnetic layer thus applied, while it was wet, to a dry thickness of 0.2 μm. Thus, Samples 3-1 to 3-4 according to the present invention and Comparative It was found that the more the average particle size of carbon black added is, the greater is the surface roughness and hence the poorer are output, C/N and overwritability.

As mentioned above, the present invention provides a magnetic recording medium comprising a ferromagnetic metal powder having a uniform particle size distribution and the constitution comprising a magnetic layer having a coercive force of from 2,000 to 3,000 Oe, a thickness of from 0.05 to 0.3 μm and a surface roughness of from 1 to 3 nm, the proportion of magnetizable components that are inverted by an external magnetic field of not less than 3,000 Oe in the magnetic layer being from 1% to (0.0225×(coercive force of magnetic layer)−38)%. The magnetic recording medium of the present invention exhibits a drastically improved short wavelength output and an excellent overwritability and thus is most suitable for the recording of a digital video signal containing a long wavelength component.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer comprising a ferromagnetic metal powder and a binder resin, wherein said magnetic layer exhibits a coercive force of from 2,000 to 3,000 Oe, and has a thickness of from 0.05 to 0.3 μm, a RaI surface roughness of from 1 to 3 nm, and the proportion of magnetizable components that are inverted by an external magnetic field of not less than 3,000 Oe in said magnetic layer is from 1% to (0.0225×(coercive force of magnetic layer)−38)% as determined by the remanence curve of said magnetic layer.

2. A magnetic recording medium comprising a nonmagnetic support having in this order thereon a nonmagnetic layer comprising a nonmagnetic material powder and a binder, and a magnetic layer comprising a ferromagnetic metal powder and a binder resin, wherein said magnetic layer exhibits a coercive force of from 2,000 to 3,000 Oe, and has a thickness of from 0.05 to 0.3 μm, a RaI surface roughness of from 1 to 3 nm, and the proportion of magnetizable components that are inverted by an external magnetic field of not less than 3,000 Oe in said magnetic layer is from 1% to (0.0225×(coercive force of magnetic layer)−38)% as determined by the remanence curve of said magnetic layer.

3. A magnetic recording medium as claimed in claim 1, wherein said magnetic layer exhibits a coercive force of from 2,000 to 2,600 Oe.

4. A magnetic recording medium as claimed in claim 2, wherein said magnetic layer exhibits a coercive force of from 2,000 to 2,600 Oe.

5. A magnetic recording medium as claimed in claim 1, wherein said magnetic layer has a thickness of from 0.05 to 0.25 μm.

6. A magnetic recording medium as claimed in claim 2, wherein said magnetic layer has a thickness of from 0.05 to 0.25 μm.

7. A magnetic recording medium as claimed in claim 1, wherein said magnetic layer has a RaI surface roughness of from 1 to 2.5 nm.

8. A magnetic recording medium as claimed in claim 2, wherein said magnetic layer has a RaI surface roughness of from 1 to 2.5 nm.

9. A magentic recording medium as claimed in claim 1, wherein the proportion of magnetizable components that are inverted by an external magnetic field of not less than 3,000 Oe in said magnetic layer is from 1% to (0.0200×(coercive force of magnetic layer)−30)% as determined by the remanence curve of said magnetic layer.

10. A magentic recording medium as claimed in claim 9, wherein the proportion of magnetizable components that are inverted by an external magnetic field of not less than 3,000 Oe in said magnetic layer is from 1% to (0.0125×(coercive force of magnetic layer)−20)% as determined by the remanence curve of said magnetic layer.

11. A magentic recording medium as claimed in claim 2, wherein the proportion of magnetizable components that are inverted by an external magnetic field of not less than 3,000 Oe in said magnetic layer is from 1% to (0.0200×(coercive force of magnetic layer)−30)% as determined by the remanence curve of said magnetic layer.

12. A magentic recording medium as claimed in claim 11, wherein the proportion of magnetizable components that are inverted by an external magnetic field of not less than 3,000 Oe in said magnetic layer is from 1% to (0.0125×(coercive force of magnetic layer)−20)% as determined by the remanence curve of said magnetic layer.

* * * * *